(12) United States Patent
Garani et al.

(10) Patent No.: US 10,026,441 B2
(45) Date of Patent: Jul. 17, 2018

(54) METHOD AND APPARATUS FOR JOINT ADAPTATION OF TWO-/MULTI-DIMENSIONAL EQUALIZER AND PARTIAL RESPONSE TARGET

(71) Applicant: Indian Institute of Science, Bangalore, Karnataka (IN)

(72) Inventors: Shayan Srinivasa Garani, Karnataka (IN); Chaitanya Kumar Matcha, Karnataka (IN); Arnab Dey, Karnataka (IN)

(73) Assignee: INDIAN INSTITUTE OF SCIENCE, Bangalore, Karnataka (IN)

( * ) Notice: Subject to any disclaimer, the term of this patent is extended or adjusted under 35 U.S.C. 154(b) by 0 days.

(21) Appl. No.: 15/648,985

(22) Filed: Jul. 13, 2017

(65) Prior Publication Data

US 2018/0018997 A1    Jan. 18, 2018

(30) Foreign Application Priority Data

Jul. 14, 2016    (IN) .............................. 201641024048

(51) Int. Cl.
*G11B 5/035*    (2006.01)
*G11B 5/09*    (2006.01)
*G11B 20/10*    (2006.01)

(52) U.S. Cl.
CPC .......... *G11B 20/10046* (2013.01); *G11B 5/09* (2013.01); *G11B 20/10009* (2013.01); *G11B 20/10055* (2013.01); *G11B 2220/2516* (2013.01)

(58) Field of Classification Search
CPC . G11B 5/035; G11B 20/10009; G11B 20/109; G11B 27/36; G11B 15/34; G11B 5/09; G11B 7/0005
USPC ........... 360/39, 65, 46, 53; 369/59.21, 59.22
See application file for complete search history.

(56) References Cited

U.S. PATENT DOCUMENTS 7,948,699 B2 * 5/2011 Liu .................. G11B 20/10009
360/39

* cited by examiner

*Primary Examiner* — Nabil Hindi
(74) *Attorney, Agent, or Firm* — D'Ambrosio & Menon, PLLC; Usha Menon

(57) ABSTRACT

The present disclosure relates to a method and apparatus for processing of multi-dimensional readback signal from magnetic recording or optical, physical data recording so as to reduce/control Inter Symbol Interference (ISI) and noise within acceptable limits. The method is based on Partial Response Maximum Likelihood (PRML) detection and takes care of time varying channel conditions. In an embodiment, the filter coefficients of both the equalizer and the partial response (PR) target are jointly adapted to account for the channel condition for both separable and non-separable targets thus reducing signal detection complexity. In an aspect, the disclosure provides an apparatus that incorporates an adaptation engine along with the equalizer and the PR target that updates filter coefficients of both the equalizer and the PR target following the formulated mathematical equations.

15 Claims, 18 Drawing Sheets

| 0.0280 | -0.0528 | -0.1001 | -0.0528 | 0.0280 |
|---|---|---|---|---|
| -0.0528 | 0.0388 | | 0.0388 | -0.0528 |
| -0.1001 | | 0.7895 | | -0.1001 |
| -0.0528 | 0.0388 | | 0.0388 | -0.0528 |
| 0.0280 | -0.0528 | -0.1001 | -0.0528 | 0.0280 |

| 0.2767 | | 0.2767 |
|---|---|---|
| | 1.0000 | |
| 0.2767 | | 0.2767 |

FIG. 18B

METHOD AND APPARATUS FOR JOINT ADAPTATION OF TWO-/MULTI-DIMENSIONAL EQUALIZER AND PARTIAL RESPONSE TARGET

TECHNICAL FIELD

The present disclosure relates to the field of signal processing. In particular, the present disclosure relates to signal processing for multi-dimensional storage technologies such as TDMR, BPM, optical, holographic storage, 3D NAND flash, etc. where Inter-Symbol-Interference (ISI) along multiple dimensions is observed.

BACKGROUND

Background description includes information that may be useful in understanding the present invention. It is not an admission that any of the information provided herein is prior art or relevant to the presently claimed invention, or that any publication specifically or implicitly referenced is prior art.

Keeping pace with advances in digital data processing, magnetic recording media such as Hard Disk Drives (HDD) has also been evolving to maintain continued growth in their data storage capacity. Specifically, efforts have been to increase areal density to reduce or maintain their size even as storage capacity keeps pace with increasing requirement.

To enable high storage densities in magnetic recording, significant efforts have been put on storage techniques like Heat-Assisted Magnetic Recording (HAMR) and Bit-Patterned Media (BPM). Since these techniques call for radical changes in the conventional media, feasibility of ultra-high storage densities ~10 Tb/in$^2$ on conventional media have been explored simultaneously by using shingled writing and two-dimensional readback. The scheme also known as two-dimensional magnetic recording (TDMR) is an exciting new option for ultra-high storage densities. But, TDMR channels come with a price of 2-D Inter Symbol Interference (ISI) and noise. Therefore, signal processing becomes significantly difficult in comparison to that in traditional 1-D recording.

In known proposed techniques for TDMR, the two-dimensional readback signal goes through process of equalization which shapes the readback magnetic recording signal to a specified partial response (PR), followed by Maximum Likelihood (ML) detection. The technique is widely used in 1D Magnetic Recording and the linear equalization allows controlled ISI called Generalized Partial Response (GPR) target.

Matcha and Srinivasain their paper titled "Target design and low complexity signal detection for two-dimensional magnetic recording" (Published in *IEEE Annual Summit and Conference of Asia-Pacific Signal and Information Processing Association (APSIPA)*, pp. 1-10, 2014) have proposed techniques to design separable and non-separable 2-D PR targets and equalizers under monic and unit energy constraints using the MMSE criterion over a 2-D ISI channel with additive white Gaussian noise (AWGN). In their paper titled "Generalized Partial Response Equalization and Data-Dependent Noise Predictive Signal Detection Over Media Models for TDMR" (Published in *IEEE Trans. Magn.*, vol. 51, no. 10, 2015), they further extended these techniques to TDMR channels using a Voronoi-based granular media model. S. Navabi and B. V. K. Vijaya Kumar, in their paper titled "Two-Dimensional Generalized Partial Response Equalizer for Bit-Patterned Media" (Published in *IEEE International Conference on Comm.*, 2007) describe a method for joint equalization with PR targets for bit-patterned media storage.

FIG. 1 illustrates a typical block diagram of non-adaptive Partial Response Maximum Likelihood (PRML) detection in case of TDMR. Here, the signal received from the read channel is equalized using a linear equalizer before the signal is detected using a ML detector. The linear equalizer reduces the extent of ISI and achieves a desired overall response called the partial response (PR). This reduces computational complexity of the ML detector with some compromise in the performance.

The PR design techniques typically deal with minimizing the mean-squared error (MMSE) with constraints on the target such as the unit energy and the monic constraints.

These techniques, however, fail to take care of the time-varying nature of SNR under dynamic conditions. Thus, the equalization process is non-adaptive which calls for a better solution that can tackle the issues arising out of the time-varying nature of magnetic recording channels. There is, therefore, a need in the art for a method and apparatus wherein the read channel is cognizant of channel conditions i.e. it takes into account the time-varying nature of the channel which can help to mitigate the effects of SNR variations along with ISI reduction/control.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

A general object of the present disclosure is to provide a method and apparatus that enables achieving bit densities higher than ~1 Tb/in$^2$ on conventional magnetic recording media.

An object of the present disclosure is to provide a method and apparatus for multi-dimensional storage technologies such as TDMR, flash drives, holographic storage etc.

An object of the present disclosure is to provide a method and apparatus for multi-dimensional recording with higher storage densities that have acceptable level of multi-dimensional Inter Symbol Interference (ISI) and noise.

Another object of the present disclosure is to provide a method and apparatus that increases bit density by optimal multi-dimensional GPR target and equalizer design.

Another object of the present disclosure is to provide a method and apparatus that is cognizant of channel conditions.

Yet another object of the present disclosure is to provide a method and apparatus that takes into account the time-varying nature of the channel and thus help mitigate effects of SNR variations along with ISI reduction/control.

Still another object of the present disclosure is to provide a method and apparatus that allow low complexity detection by separable targets resulting in significant throughput gains.

SUMMARY

Aspects of the present disclosure relate to storage and communication channels. In particular, it pertains to processing of multi-dimensional signal so as to control the Inter Symbol Interference (ISI) and noise within acceptable limits.

In an aspect, the disclosed method is based on Partial Response Maximum Likelihood (PRML) detection. In an embodiment, before signal detection, readback signal goes through a process of equalization using a linear equalizer, wherein the equalization takes care of channel condition accounting for various time varying factors such as wear & tear, temperature variations and other similar factors. In an embodiment, filter coefficients of both the equalizer and the partial response (PR) target can be jointly adapted to account for the channel condition. This helps to mitigate the effects of SNR variations along with ISI reduction/control.

In an aspect, the disclosed method does adaptive equalization for both separable and non-separable targets reducing signal detection complexity. This is especially helpful in reducing signal detection complexity compared to a non-separable target of the same size. It also helps in performance improvement using a larger separable PR target with the same detection complexity as that of a smaller non-separable PR target.

In an aspect, the disclosed method can be used for PR target and equalizer of arbitrary shape and size such as hexagonal and other sampling geometries. The method can also be used to design separable 2D PR targets of polygonal shape with 2N sides using N separable 1D components. Similarly, multidimensional separable PR targets of 2N faces can be designed using N separable 1-D components. The separable targets can also be designed using <N non-1D components.

In an aspect, the disclosure provides a method of jointly designing the equalizer and the PR targets which adapts to the changing channel conditions mindful of hardware constraints. The disclosure formulates mathematical equations to implement the jointly designed equalizer and the PR targets. In an embodiment, the jointly designing of separable and non-separable multi-dimensional PR targets and equalizers is done under monic and unit energy constraints using the MMSE criterion.

In an aspect, the disclosure provides an apparatus that incorporates hardware for adapting targets and equalizer. The hardware is an adaptation engine along with the equalizer and the PR target that updates filter coefficients of both the equalizer and the PR target following the formulated mathematical equations.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIGS. 17A and 17B illustrate exemplary 5×5 filters showing values of filter coefficients for the equalizer and the PR target respectively at the end of simulation of 64×64 samples in accordance with embodiments of the present disclosure.

FIGS. 18A and 18B illustrate exemplary 5×5 filters showing theoretical values of optimum filter coefficients for the equalizer and the PR target respectively found using MATLAB in accordance with embodiments of the present disclosure.

DETAILED DESCRIPTION

Figure 1:
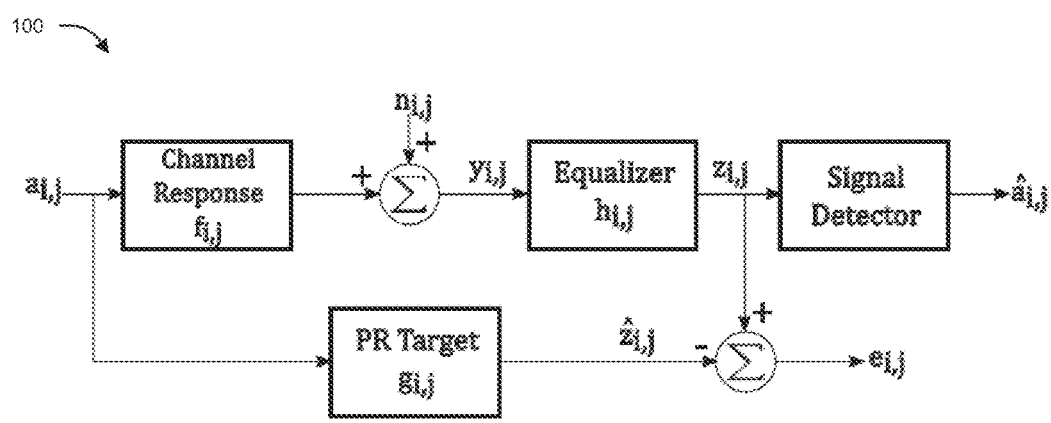
FIG. 1 illustrates block diagram depicting widely used non-adaptive technique for partial response maximum likelihood (PRML) detection in TDMR.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The present disclosure relates to a method and apparatus for processing of a multi-dimensional communication and storage signals that achieve controlled Inter Symbol Interference (ISI) and noise within acceptable limits. For example, this enables storage densities that are higher than 1 Tb/in$^2$ on conventional magnetic recording media.

In an aspect, the disclosed method is based on Partial Response Maximum Likelihood (PRML) detection. Several partial response (PR) target design techniques are available for 1-D magnetic recording channels. For the case of multi-dimensional ISI channels, there is a greater need for PR equalization due to high computational complexity of the multi-dimensional detection algorithms. The 1-D PR design techniques typically deal with minimizing the mean-squared error. In embodiments explained herein, these techniques have been extended to design separable and non-separable 2-D PR targets and equalizers under monic and unit energy constraints using the MMSE criterion for the 2-D ISI channel with additive white Gaussian noise. It is to be appreciated that though embodiments of the present disclosure have been described with reference to two-dimensional ISI channels, these can be extended to multi-dimensional ISI channels as well, and such applications are well within the scope of the present disclosure.

However, these techniques are not cognizant of channel conditions. Magnetic and optical recording channels are characterized as slowly time varying media due to wear and tear, temperature variations and other factors. The present disclosure provides a solution to this by having a linear equalizer that adapts to varying channel conditions so that the signal detection is not impacted. The disclosed method further helps by reducing the extent of ISI to a predefined target response as seen by the detector.

In an embodiment, the filter coefficients of both the equalizer and the partial response (PR) target can be jointly adapted to account for the channel condition. This helps to mitigate the effects of SNR variations along with ISI reduction/control.

It would be appreciated that storage channel is highly non-linear, and therefore data written on to a storage medium will undergo channel artifacts and must be equalized to undo the channel effects. It is practically impossible to have an ideal equalizer which is a perfect inverse of the channel due to large filter lengths required for this purpose. However, the cascade of the channel and the equalizer can be approximated to a partial response target. Data through the channel and the equalizer can be viewed as being filtered through the partial response target in the equivalent signal path.

Having a partial response target allows controlled amount of inter-symbol interference (ISI) that can be introduced. Almost all signal detectors assume a certain form of partial response target already available to them in order to perform signal detection. This invention allows us to dynamically change the equalizer and partial response target coefficients in a multi-dimensional set up according to dynamic channel conditions to boost the SNR performance.

In an aspect of the present invention, adaptation can be done in a batch mode i.e., when the quality monitoring component of the IC flags indicates increased number of errors due to medium SNR changes or aging of the device.

In an aspect, the present disclosure relates to a computer-implemented method for processing of multi-dimensional readback signal to reduce Inter Symbol Interference (ISI) and noise, said method comprising the step of: equalizing the readback signal using a linear equalizer that adapts to varying channel conditions; and designing a Partial Response (PR) target for signal detection based on Partial Response Maximum Likelihood (PRML) and the equalizer output, wherein the equalizer and the PR target are jointly adapted.

In an aspect, the step of equalizing enables handling of channel conditions accounting for one or more time varying factors selected from any or a combination of wear and tear, media and temperature variations. In another aspect, one or more filter coefficients for the linear equalizer and the PR target are jointly adapted to account for channel condition to help mitigate effects of SNR variations along with ISI reduction/control. In yet another aspect, output of the equalizer is compared with target response to obtain an error that is used to update the one or more filter coefficients.

In an aspect, the equalizer is any of a separable or a non-separable equalizer. In another aspect, the PR target is any of a separable or a non-separable PR target. In yet another aspect, the equalizer performs equalization for both separable and non-separable PR targets.

The present disclosure further relates to an apparatus comprising an adaptation engine, said engine being configured to, along with an equalizer and a PR target, update filter coefficients of both the equalizer and the PR target to enable processing of a multi-dimensional readback signal to reduce Inter Symbol Interference (ISI) and noise. In an aspect, the equalizer performs equalization under varying channel conditions.

In an aspect, the apparatus can be disk drive having a processor configured to decode data written over a plurality of tracks of a disk, wherein the processor is coupled with a memory and configured to perform the above-mentioned features/functions. In an aspect, polar symmetry of the PR target can be used to optimize the adaptation engine. In another aspect, the PR target can be a 2D separable PR target such that the PR target is extended to polygons of 2N sides using 1D separable components, or the PR target can be a multi-dimensional separable PR target such that the PR target is extended to 2N faces using 1D separable components. In another aspect, realization of 2D and multi-dimensional separable PR targets is performed using less than N non-1D components.

Figure 2:
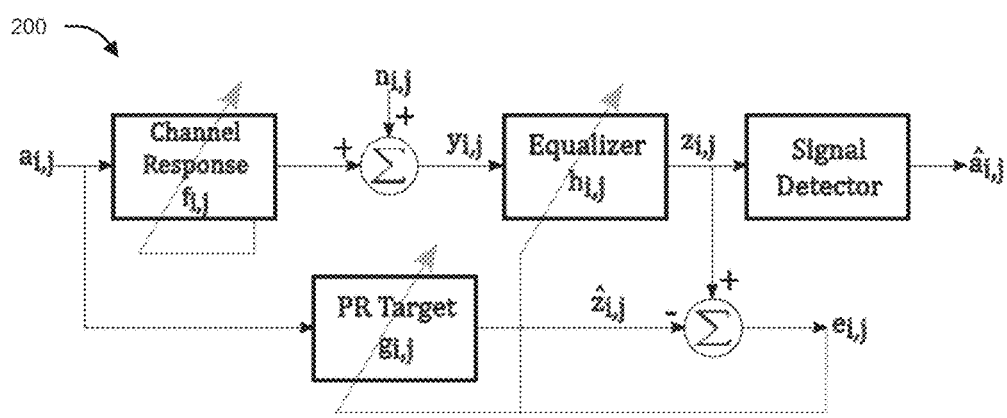
FIG. 2 illustrates an exemplary block diagram depicting a joint adaptation engine which can perform equalization under varying channel conditions in accordance with embodiments of the present disclosure.

FIG. 2 illustrates an exemplary block diagram 200 of a joint adaptation engine which can perform equalization under varying channel conditions in accordance with embodiments of the present disclosure. As shown in the block diagram 200, in the proposed partial response equalization scheme for TDMR channels, readback signal which is the response of the AWGN 2-D channel is passed through the equalizer. Target response is compared with the equalizer output to obtain the error $e_{i,j}$ which is then used to provide LMS update for the filter coefficients.

In an aspect, the disclosed method does adaptive equalization for both separable and non-separable targets reducing signal detection complexity. This is especially helpful in reducing signal detection complexity compared to a non-separable target of the same size in the severely restricted 2-D PR target size. It also helps in performance improvement using a larger separable PR target with the same detection complexity as that of a smaller non-separable PR target.

Figure 3:
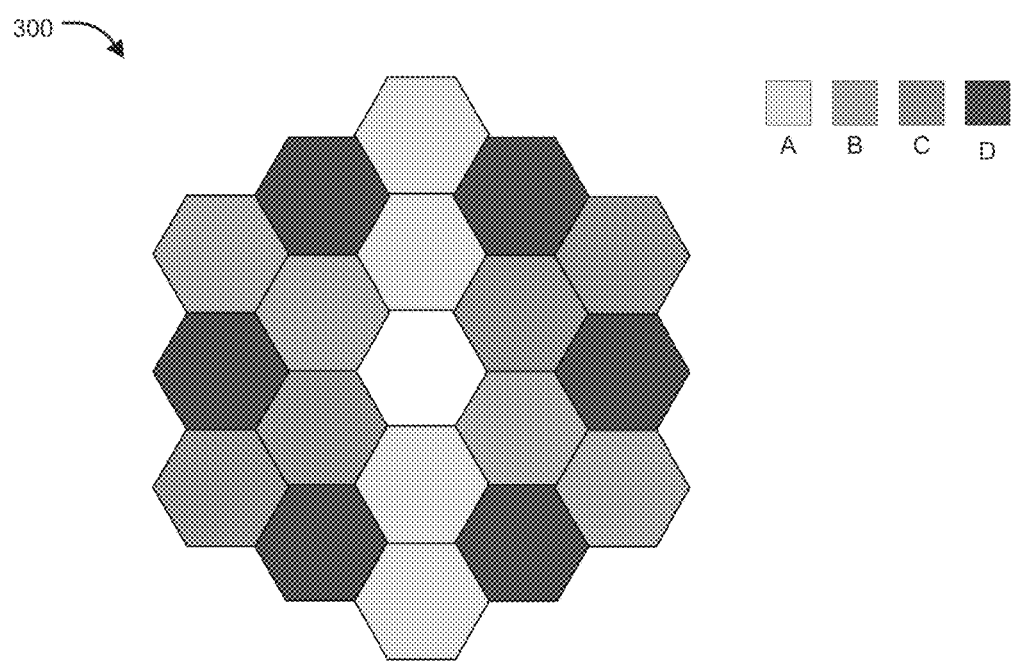
FIG. 3 illustrates an exemplary 2D hexagonal separable PR targetin accordance with an embodiment of the present disclosure.

In an aspect, the disclosed method can be used for PR target and equalizer of arbitrary shape and size such as hexagonal and other sampling geometries. FIG. 3 illustrates an exemplary 2D hexagonal separable PR target. The cells with shade A, B and C indicate the separable components. The PR target taps for the white cell and those with shade D can be derived using these components. The method can also be used to design separable 2D PR targets of 2N-polygonal shape using N separable 1D components. Similarly, multi-dimensional separable PR targets of 2N faces can be designed using N separable 1-D components. The separable targets can also be designed using <N non-1D components.

In an aspect, the disclosure provides a method of jointly designing the equalizer and the PR targets which adapts to the changing channel condition mindful of hardware constraints, and formulates mathematical equations to implement the jointly designed equalizer and the PR targets. In an embodiment, the jointly designing of separable and non-separable 2-D PR targets and equalizers is done under monic and unit energy constraints using the MMSE criterion.

In an aspect, the disclosure provides an apparatus that incorporates hardware for adapting targets and equalizer. The hardware is an adaptation engine along with the equalizer and the PR target that updates filter coefficients of both the equalizer and the PR target following the formulated mathematical equations.

Before discussing the target design techniques, a vector notation applicable to 2-D signals that has been used by the inventors is introduced in their paper titled "Generalized Partial Response Equalization and Data-Dependent Noise Predictive Signal Detection Over Media Models for TDMR" (published in *IEEE Trans. Magn.*, vol. 51, no. 10, 2015). The 2-D ISI and filtering operations in discrete time involve summations over two indices and are often cumbersome while writing in equations. It is cumbersome to repeatedly describe these operations within equations. Furthermore, it requires a different representation for ISI span of different shapes such as the hexagonal masks used in BPM with staggered sampling. To simplify and generalize the 2-D ISI and filtering operations, a vector notation, as described further, is introduced to define the input symbols first followed by the ISI coefficients.

Let $\hat{f}_i$, i, j= . . . , −1, 0, 1, 2, . . . be the two-dimensional ISI coefficients and $a_{i,j}$, i, j= . . . , −1, 0, 1, 2, . . . be the input symbols. The output samples without noise are given by the 2-D convolution operation as follows.

$$\hat{y}_{i,j} = \sum_{m=-\infty}^{\infty} \sum_{n=-\infty}^{\infty} a_{i-m,j-n} \hat{f}_{m,n}$$

Defining $f_{i,j} = \hat{f}_{-i,-j}$, may write the 2-D convolution operation as:

$$\hat{y}_{i,j} = \sum_{m=-\infty}^{\infty} \sum_{n=-\infty}^{\infty} a_{i+m,j+n} f_{m,n}$$

We refer to this representation of $f_i$ as ISI mask. This 2 D ISI mask can be represented using a 2-D matrix F whose elements are $f_i$, We use vec (.) operator to convert a 2-D matrix to a column vector by ordering the elements of the matrix in the raster scan order. We also define (i, j) as a column vector obtained by similarly ordering the symbols/values $a_{i,j}$ relative to the position (i, j).

For example:

$$F = \begin{bmatrix} f_{0,0} & f_{0,1} \\ f_{1,0} & f_{1,1} \end{bmatrix} \Rightarrow vec(F) = [f_{0,0} \quad f_{0,1} \quad f_{1,0} \quad f_{1,1}]$$

And thus, $$\underline{a}_F^{(i,j)} = [a_{i,j} a_{i,j+1} a_{i+1,j} a_{i+1,j+1}]$$

Using this vector notation, the 2-D ISI can be written as:

$$y_{i,j} = (vec(F))^T \underline{a}_F^{(i,j)}$$

Further following notation have been used in the current disclosure:

$a_i, \in [-1,1]$, i, j= . . . , −1, 0, 1, 2, . . . denote a plane of input symbols/bits that are written onto medium.

$y_i$, i, j= . . . , −1, 0, 1, 2, . . . denote the plane of discrete time samples read from the medium.

$[h_i]$, i, j= . . . , −1, 0, 1, 2, . . . are the set of coefficients of the equalizer. Let H be a 2-D matrix whose elements are the coefficients $h_i$, and let h=vec (H).

Using this vector notation, the samples at the output of the equalizer are:

$$z_{i,j} = \underline{h}^T \underline{y}_H^{(i,j)}$$

$[g_i]$, i, j= . . . , −1, 0, 1, 2, . . . are the set of coefficients of the PR target. Let G be a 2-D matrix whose elements are the coefficients $g_i$, and let g=vec (G). Using this vector notation, the ideal samples at the input of the ML detector can be written as:

$$\hat{z}_{i,j} = \underline{g}^T \underline{a}_G^{(i,j)}$$

Thus, the error can be written as:

$$e_{i,j} = z_{i,j} - \hat{z}_{i,j}$$

Now, we may write the instantaneous squared error (SE) as:

$$SE = |e_{i,j}|^2 = (z_{i,j} - \hat{z}_{i,j})^2 = (\underline{h}^T \underline{y}_H^{(i,j)} - a_{i,j} g_{0,0} - \underline{g}^T \underline{a}_G^{(i,j)})^2$$

Where, $g_{0,0}$ is the centre tap coefficient of the PR target $$\underline{g}^T = [g_{-N,-N} \cdots g_{-1} g_{0,1} \cdots g_{N,N}]$$

Now, the gradient of this squared error can be found which is then used to update the filter coefficients of the equalizer as well as the PR target. Here, in order to provide least-mean-square (LMS) updates, cases for both separable and non-separable targets are considered.

Non-Separable Targets:

The gradients are computed as follows:

$$\Delta \underline{h} = \frac{\partial}{\partial \underline{h}} SE = 2e_{i,j} \frac{\partial e_{i,j}}{\partial \underline{h}} = 2e_{i,j} \frac{\partial z_{i,j}}{\partial \underline{h}}$$

$$\Delta \underline{g} = \frac{\partial}{\partial \underline{g}} SE = 2e_{i,j} \frac{\partial e_{i,j}}{\partial \underline{g}} = -2e_{i,j} \frac{\partial \hat{z}_{i,j}}{\partial \underline{g}}$$

1) Monic Constraint:

In case of jitter-dominant channels where unconditioned channel noise samples are highly correlated, the monic constraint on the equalizer target response, as already known, tends to whiten the noise samples at the equalizer output. Under monic constraint which makes the centre tap ($g_{0,0}=1$) of the filter unity, we obtain the following.

$$\Delta \underline{h} = \frac{\partial}{\partial \underline{h}} SE = 2e_{i,j} \underline{y}_H^{(i,j)}$$

$$\Delta \underline{g} = \frac{\partial}{\partial \underline{g}} SE = -2e_{i,j} \underline{a}_G^{(i,j)}$$

Hence, the update equations for the filter coefficients become $$\underline{h} \leftarrow \underline{h} - \mu \Delta \underline{h} = \underline{h} - 2\mu e_{i,j} \underline{y}_H^{(i,j)}$$

$$\underline{g} \leftarrow \underline{g} - \mu \Delta \underline{g} = \underline{g} + 2\mu e_{i,j} \underline{a}_G^{(i,j)}$$

2) Unit Energy Constraint:

Under unit energy constraint, we find the following:

$$\Delta \underline{h} = \frac{\partial}{\partial \underline{h}} SE = 2e_{i,j} \underline{y}_H^{(i,j)}$$

$$\Delta \underline{g} = \frac{\partial}{\partial \underline{g}} SE = 2e_{i,j} \left( \frac{1}{g_{0,0}} \underline{g} a_{i,j} - \underline{a}_G^{(i,j)} \right)$$

$$g_{0,0} = \sqrt{1 - \underline{g}^T \underline{g}}$$

Hence, the update equations for the filter coefficients become $$\underline{h} \leftarrow \underline{h} - \mu \Delta \underline{h} = \underline{h} - 2\mu e_{i,j} \underline{y}_H^{(i,j)}$$

$$\underline{g} \leftarrow \underline{g} - \mu \Delta \underline{g} = \underline{g} - 2\mu e_{i,j} \left( \frac{1}{g_{0,0}} \underline{g} a_{i,j} - \underline{a}_G^{(i,j)} \right)$$

Separable Targets:

We define the PR target with the help of two vectors namely:

$$\underline{g}_r = [g_{0,-N} \cdots g_{0,-1} g_{0,1} \cdots g_{0,N}]^T$$

$$\underline{g}_c = [g_{-M,0} \cdots g_{-1,0} g_{1,0} \cdots g_{M,0}]^T$$

Figure 4:
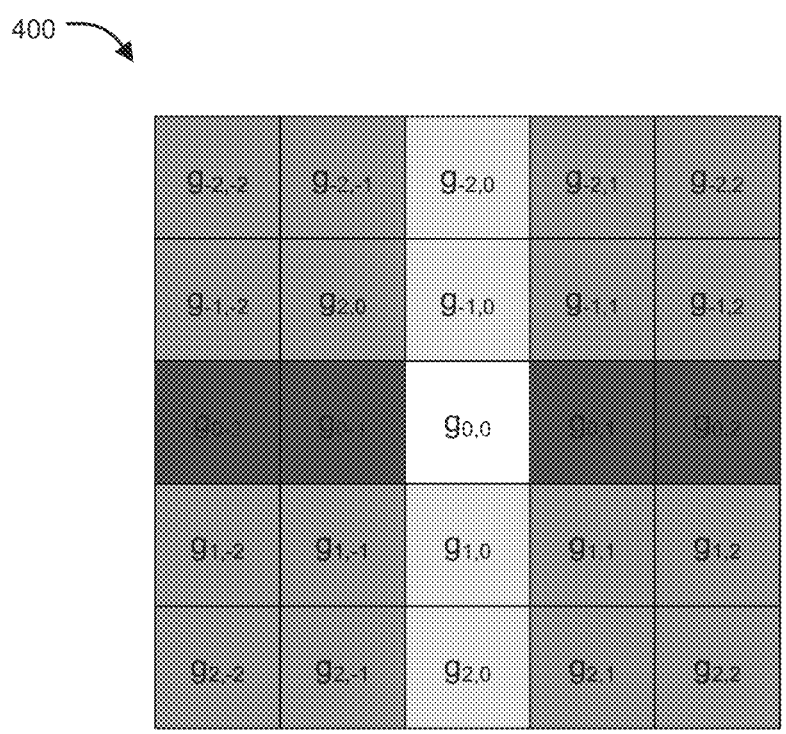
FIG. 4 illustrates an exemplary 5×5 filter showing separability of coefficients.

In FIG. 4 a 5×5 PR target (separable) for which M=2, N=2 has been shown. The middle column and the middle row are independent coefficients. Rest of the coefficients are derived as $g_{i,j} = g_{i,0} g_{0,j} / g_{0,0}$. Further, $g_{0,0}$ is the centre tap coefficient which is derived based on unit energy or monic constraint. Thus, G may be written as:

$$G = [g_{i,j}]_{1 \leq |i| \leq M, 1 \leq |j| \leq N} = \underline{g}_c \underline{g}_r^T$$

where we have excluded $g_{0,0}$ which will depend on the constraint imposed.

We write the squared error (SE) as follows:

$$SE = |e_{i,j}|^2 = (\underline{h}^T \underline{y}_H^{(i,j)} - a_{i,j} g_{0,0} - \underline{g}^T \underline{a}_G^{(i,j)} - \underline{g}_r^T \underline{a}_r^{(i,j)} - \underline{g}_c^T \underline{a}_c^{(i,j)})^2$$

where $\underline{a}_r^{(i,j)} = A^T \underline{g}_c$ and $\underline{a}_c^{(i,j)} = A \underline{g}_r$ with $A = [a_{i,j}]_{1 \leq |i| \leq M, 1 \leq |j| \leq N}$ The gradients are computed as follows.

$$\Delta \underline{h} = \frac{\partial}{\partial \underline{h}} SE = 2e_{i,j} \frac{\partial e_{i,j}}{\partial \underline{h}} = 2e_{i,j} \frac{\partial z_{i,j}}{\partial \underline{h}}$$

$$\Delta \underline{g}_r = \frac{\partial}{\partial \underline{g}_r} SE = 2e_{i,j} \frac{\partial e_{i,j}}{\partial \underline{g}_r} = -2e_{i,j} \frac{\partial \hat{z}_{i,j}}{\partial \underline{g}_r}$$

$$\Delta \underline{g}_c = \frac{\partial}{\partial \underline{g}_c} SE = 2e_{i,j} \frac{\partial e_{i,j}}{\partial \underline{g}_c} = -2e_{i,j} \frac{\partial \hat{z}_{i,j}}{\partial \underline{g}_c}$$

1) Monic Constraint:

Under monic constraint which forces the centre tap ($g_{0,0}=1$) of the filter to be unity, we obtain the following.

$$\Delta \underline{h} = 2e_{i,j} \frac{\partial z_{i,j}}{\partial \underline{h}} = 2e_{i,j} \underline{y}_H^{(i,j)}$$

$$\Delta \underline{g}_r = -2e_{i,j} \frac{\partial \hat{z}_{i,j}}{\partial \underline{g}_r} = -2e_{i,j} \left( \underline{a}_{g_r}^{(i,j)} + \underline{a}_r^{(i,j)} \right)$$

$$\Delta \underline{g}_c = -2e_{i,j} \frac{\partial \hat{z}_{i,j}}{\partial \underline{g}_c} = -2e_{i,j} \left( \underline{a}_{g_c}^{(i,j)} + \underline{a}_c^{(i,j)} \right)$$

Hence, the update equations for the filter coefficients become $$\underline{h} \leftarrow \underline{h} - \mu \Delta \underline{h} = \underline{h} - 2\mu e_{i,j} \underline{y}_H^{(i,j)}$$

$$\underline{g}_r \leftarrow \underline{g}_r - \mu \Delta \underline{g}_r = \underline{g}_r + 2\mu e_{i,j} (\underline{a}_{g_r}^{(i,j)} + \underline{a}_r^{(i,j)})$$

$$\underline{g}_c \leftarrow \underline{g}_c - \mu \Delta \underline{g}_c = \underline{g}_c + 2\mu e_{i,j} (\underline{a}_{g_c}^{(i,j)} + \underline{a}_c^{(i,j)})$$

2) Unit Energy Constraint:

Under unit energy constraint, the squared error (SE) can be written as below.

$$SE = |e_{i,j}|^2 = (\underline{h}^T \underline{y}_H^{(i,j)} - a_{i,j} g_{0,0} - \underline{g}^T \underline{a}_G^{(i,j)} - \underline{g}_r^T \underline{a}_r^{(i,j)} - \underline{g}_c^T \underline{a}_c^{(i,j)})^2$$

where we define $$\underline{a}_r^{(i,j)} = A^T \underline{g}_c \text{ and } \underline{a}_c^{(i,j)} = A\underline{g}_r \text{ with } A = [a_{i,j}]_{1 \leq |i| \leq M, 1 \leq |j| \leq N}$$

$$\underline{g}_r = \frac{\underline{g}'_r}{\sqrt{1 - |\underline{g}'_c|^2}}$$

$$\underline{g}_c = \frac{\underline{g}'_c}{\sqrt{1 - |\underline{g}'_r|^2}}$$

with $$\underline{g}'_r = [g_{0,-N} \cdots g_{0,-1} \; g_{0,1} \cdots g_{0,N}]^T$$

$$\underline{g}'_c = [g_{-M,0} \cdots g_{-1,0} \; g_{1,0} \cdots g_{M,0}]^T$$

Thus, we obtain the following.

$$\Delta \underline{h} = 2e_{i,j} \frac{\partial z_{i,j}}{\partial \underline{h}} = 2e_{i,j} \underline{y}_H^{(i,j)}$$

$$\Delta \underline{g}_r = -2e_{i,j} \frac{\partial \hat{z}_{i,j}}{\partial \underline{g}_r} = -2e_{i,j} \left\{ \begin{array}{c} -\underline{g}_r \frac{1}{g_{0,0}} (1 - \underline{g}_c^r \underline{g}_c) a_{i,j} + \sqrt{1 - \underline{g}_c^r \underline{g}_c} \; \underline{a}_{g_r}^{(i,j)} - \\ \underline{g}_r (1 - \underline{g}_r^r \underline{g}_r)^{-\frac{1}{2}} (\underline{g}_c^r \underline{a}_{g_c}^{(i,j)}) + \underline{a}_r^{(i,j)} \end{array} \right\}$$

$$\Delta \underline{g}_c = -2e_{i,j} \frac{\partial \hat{z}_{i,j}}{\partial \underline{g}_c} = -2e_{i,j} \left\{ \begin{array}{c} -\underline{g}_c \frac{1}{g_{0,0}} (1 - \underline{g}_r^r \underline{g}_r) a_{i,j} + \sqrt{1 - \underline{g}_r^r \underline{g}_r} \; \underline{a}_{g_c}^{(i,j)} - \\ \underline{g}_c (1 - \underline{g}_c^r \underline{g}_c)^{-\frac{1}{2}} (\underline{g}_r^r \underline{a}_{g_r}^{(i,j)}) + \underline{a}_c^{(i,j)} \end{array} \right\}$$

Hence, the update equations for the filter coefficients become $$\underline{h} \leftarrow \underline{h} - \mu \Delta \underline{h} = \underline{h} - 2\mu e_{i,j} \underline{y}_H^{(i,j)}$$

$$\underline{g}_r + \underline{g}_r - \mu \Delta \underline{g}_r =$$

$$\underline{g}_r + 2\mu e_{i,j} \left( -\underline{g}_r \frac{1}{g_{0,0}} (1 - \underline{g}_c^T \underline{g}_c) a_{i,j} + \sqrt{1 - \underline{g}_c^T \underline{g}_c} \; \underline{a}_{g_r}^{(i,j)} - \right.$$
$$\left. \underline{g}_r (1 - \underline{g}_r^T \underline{g}_r)^{-\frac{1}{2}} (\underline{g}_c^T \underline{a}_{g_c}^{(i,j)}) + \underline{a}_r^{(i,j)} \right)$$

$$\underline{g}_c + \underline{g}_c - \mu \Delta \underline{g}_c = \underline{g}_c + 2\mu e_{i,j} \left( -\underline{g}_c \frac{1}{g_{0,0}} (1 - \underline{g}_r^T \underline{g}_r) a_{i,j} + \right.$$
$$\left. \sqrt{1 - \underline{g}_r^T \underline{g}_r} \; \underline{a}_{g_c}^{(i,j)} - \underline{g}_r (1 - \underline{g}_c^T \underline{g}_c)^{-\frac{1}{2}} (\underline{g}_r^T \underline{a}_{g_c}^{(i,j)}) + \underline{a}_c^{(i,j)} \right)$$

In this case, the coefficients $g_{0,0}$, $\underline{g}_r$ and $\underline{g}_c$ are updated as follows.

$$g_{0,0} = \sqrt{1 - |\underline{g}'_r|^2} \sqrt{1 - |\underline{g}'_c|^2}$$

This way LMS update equations have been formulated for the joint adaptation of the equalizer and the PR target. In an embodiment, the formulated equations for the joint adaptation of the equalizer and the PR target can be implemented using a hardware which is an adaptation engine along with the equalizer and the PR target that updates filter coefficients of both the equalizer and the PR target following the formulated mathematical equations.

Figure 5:
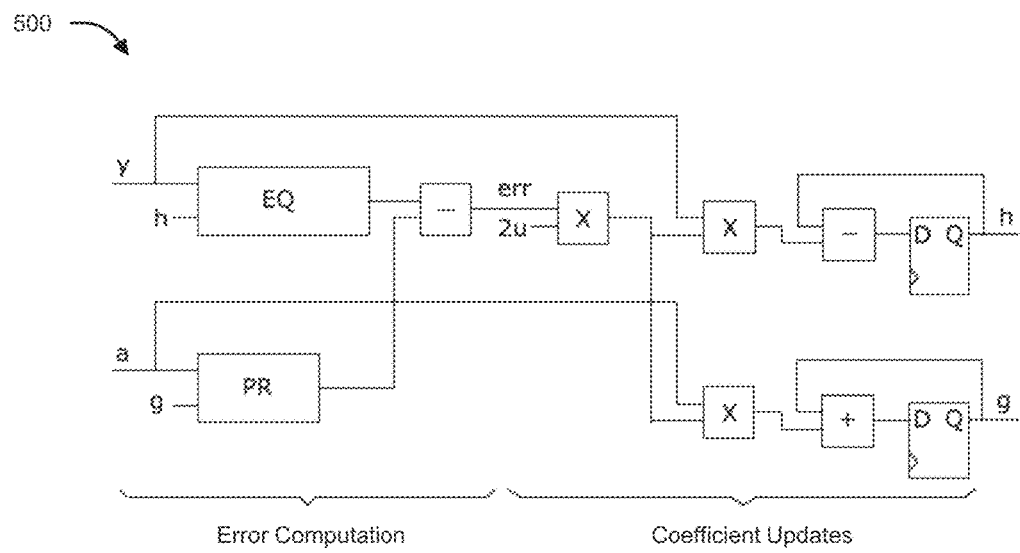
FIG. 5 illustrates an exemplary block diagram showing top-level architecture of the adaptation engine along with the equalizer and the PR target in accordance with embodiments of the present disclosure.

FIG. 5 illustrates an exemplary block diagram 500 showing top-level architecture of the adaptation engine along with the equalizer and the PR target in accordance with embodiments of the present disclosure. In the diagram 500, y is the channel output which is convolved with equalizer filter coefficients h. Likewise, a is convolved with PR target coefficients g. Then the error (err) is computed. Next, the filter coefficients of both the equalizer and the PR target are updated following the equations formulated above.

Figure 6:
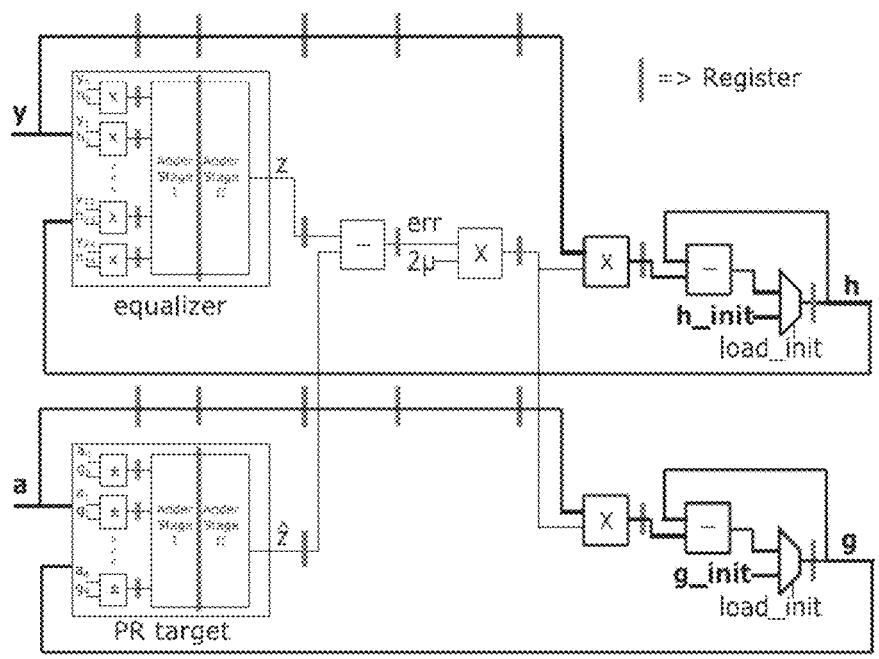
FIG. 6 illustrates an exemplary detailed diagram of the pipelined version of the adaptation engine along with the equalizer and the PR target in accordance with embodiments of the present disclosure.

FIG. 6 illustrates an exemplary detailed diagram 600 of the pipelined version of the adaptation engine along with the equalizer and the PR target in accordance with embodiments of the present disclosure. In the equalizer block, element-wise multiplication happens in the first stage and then the products are added in two stages. Since a $\in \{-1,1\}$ we save area by replacing multiplication with a buffer/complementer unit (±) which outputs $g_n$ if input is 1 and outputs complement of $g_n$ if input is −1. Bold-faced signal wires in the diagram 600 represent group of elements of pertaining vector. For example, h represents all the coefficients of the equalizer response. All the elements of h are updated using similar hardware blocks. Further, g_init and h_init are the initial filter coefficients which are loaded into the registers using the load_init signal from the controller.

In an exemplary embodiment, the disclosed top-level architecture of the adaptation engine with the equalizer filter and the partial response (PR) target is shown in FIG. 5 and the pipelined version of the architecture is shown is FIG. 6 have been implemented in VHDL for non-separable targets under monic constraint. The RTL design has been synthesized and tested for Virtex-7 FPGA in Xilinx VC707 Evaluation Platform. Implementation details of the various functional units are provided below.

Computation of Filter Outputs

In the referred implementation of the architecture shown in FIG. 6, the equalizer is implemented as a 5×5 filter and the PR target is implemented as a 3×3 filter. In the FIG. 6, $y_0$ to $y_{24}$ represent the equalizer inputs which are the outputs of the AWGN channel. The filter coefficients for the equalizer are written as $h_0$ through $h_{24}$. Similarly, the filter coefficients for the PR target are written as $g_0$ through $g_8$ since a 3×3 filter is implemented. The inputs to the PR target are shown as $a_0$ to $a_8$. In the architecture shown in FIG. 6, the equalizer and the PR target are realized as a combination of multipliers and adders. As shown, z and $\hat{z}$ are the output signals generated by the equalizer and the PR target respectively. A subtractor is used to generate the error signal from z and $\hat{z}$.

Update of Filter Coefficients

Following update equations for the equalizer coefficients and the PR target coefficients have been used in the implementation.

$$\underline{h} \leftarrow \underline{h} - \mu \Delta \underline{h} = \underline{h} - 2\mu e_{i,j} \underline{y}_H^{(i,j)}$$

$$\underline{g} \leftarrow \underline{g} - \mu \Delta \underline{g} = \underline{g} + 2\mu e_{i,j} \underline{a}_G^{(i,j)}$$

Architecture shown in FIG. 5 has been used for updating the filter coefficients, which is consistent with the equations derived. The common factor of $2\mu e_{i,j}$ is computed separately. Apart from this common term, update of each coefficient of the equalizer involves one D Flip-flop, one subtractor and one multiplier. Likewise, update of each coefficient of the PR target involves one D Flip-flop, one adder and one multiplier.

Polar Symmetry in Filter Coefficients

Figure 7A:
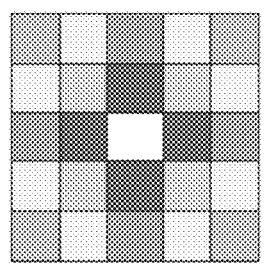
FIGS. 7A and 7B illustrate an exemplary 5×5 filter depicting polar symmetry in the coefficients in accordance with embodiments of the present disclosure.
Figure 7B:
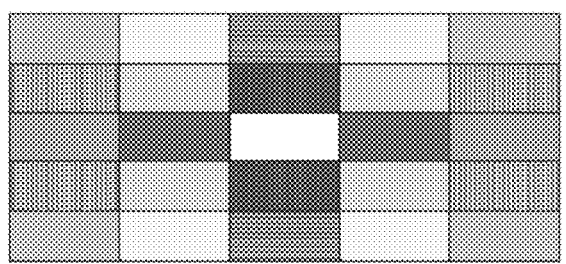

FIGS. 7A and 7B illustrate exemplary 5×5 filter (symmetrical and asymmetrical respectively) depicting polar symmetry in the coefficients in accordance with embodiments of the present disclosure. Elements having same grey shade have identical values. This polar symmetry of the filter coefficients is utilized to reduce chip footprint. As can be seen from FIG. 7A, only 6 values out of a total of 25 coefficients need to be updated in case of symmetric channels with identical inter-track and intra-track spacing. Likewise for symmetrical 3×3 filter only 3 coefficients instead of total 9 coefficients need to be updated. In case of asymmetric channels more registers need to be updated as shown in FIG. 7B with hatched boxes.

Fixed-Point Arithmetic Over Floating-Point Arithmetic

Fixed-point arithmetic computations are usually simpler than the floating-point arithmetic ones. They also require lesser area for implementations in comparison to their counterparts. Also, because of simpler circuitry, the fixed-point computations consume less power. Hence, fixed-point arithmetic has been chosen even though they offer low precision and low dynamic range. However, the same design can be realized using floating-point arithmetic units for higher precision at the cost of area and power.

Q2.13 Format

Figure 8:
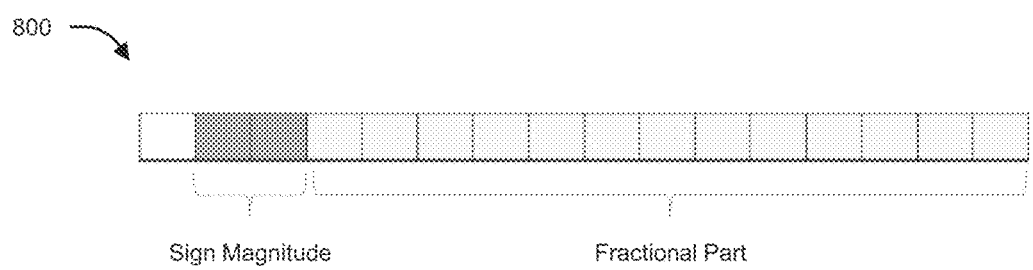
FIG. 8 illustrates an exemplary Q2.13 format used for representing the numeric values in accordance with embodiments of the present disclosure.

FIG. 8 illustrates an exemplary Q2.13 format 800 used for representing the numeric values in accordance with embodiments of the present disclosure. The Q2.13 format shown herein has been chosen based on MATLAB simulations for the representation of the numeric values in the disclosed design. This format uses one bit for sign, two bits for magnitude and 13 bits for fractional part as shown in FIG. 8. The disclosed format gives a precision of $\frac{1}{2}^{13}=1/8192$ ($\approx 0.000122$).

Fixed-Point Computation Units

In an embodiment, the disclosure provides fixed point adder and the multiplier units to implement the disclosed architecture which take inputs in Q2.13 format and produce outputs in the same format.

Figure 9:
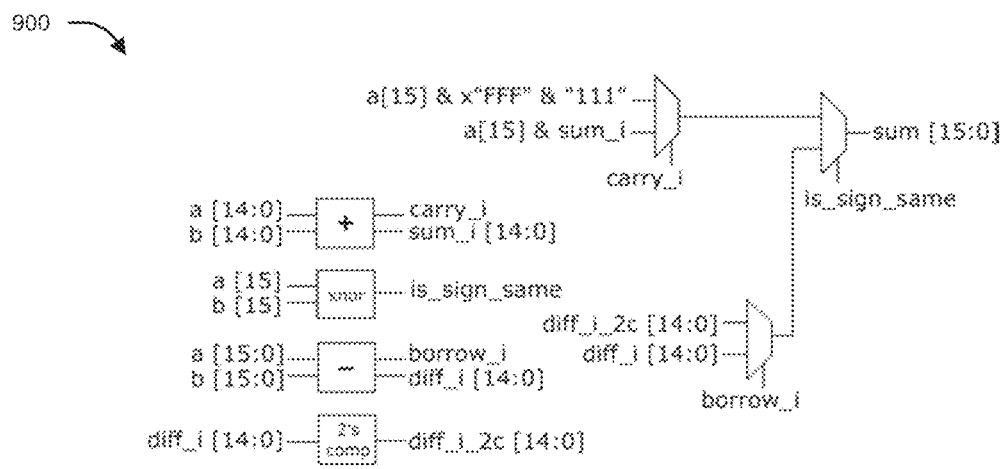
FIG. 9 illustrates an exemplary block diagram of fixed-point adder with additional logic to avoid overflow in accordance with embodiments of the present disclosure.

FIG. 9 illustrates an exemplary block diagram 900 of fixed-point adder with additional logic to avoid overflow (in sign-magnitude representation) where the blocks labelled '+' and '−' represent unsigned addition and subtraction respectively; a and b are the inputs to the adder with sum is output of the adder.

Figure 10:
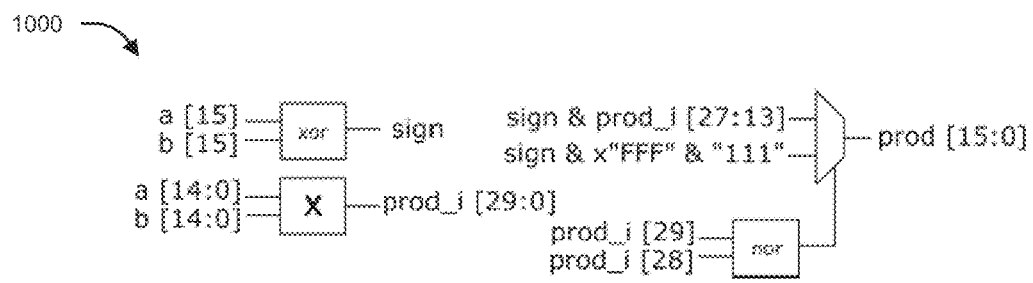
FIG. 10 illustrates an exemplary block diagram of fixed-point multiplier with additional logic to avoid overflowin accordance with embodiments of the present disclosure.

FIG. 10 illustrates an exemplary block diagram 1000 of the fixed-point multiplier with additional logic to avoid overflow (in sign-magnitude representation). Here, a and b are the inputs (Q2.13 format) to the multiplier, prod is the output (Q2.13 format) of the multiplier. The block labelled 'X' represents unsigned multiplication.

In both adder and multiplier units, additional hardware to 'clip' the result in case of overflow has been used. To avoid additional computational delay, more bits need to be allocated. For example, $[\log_2 25]$ or 5 additional bits are needed to avoid overflow at the output of the equalizer filter.

For non-return to zero (NRZ) sequence, inputs $a_{i,j} \in \{-1, 1\}$. Therefore, for the PR target response, multiplication is replaced with a buffer/complementer unit (labelled as ± in FIG. 4) which outputs $g_n$ if input is 1 and outputs complement of $g_n$ if input is −1 (for n=0, 1, . . . , 8).

Sign-Magnitude Vs. 2's Complement

The adder and multiplier units shown in FIG. 9 and follow sign-magnitude representation in Q2.13 format. In this representation, the adder unit is fairly complex in comparison to its counterpart following 2's complement representation. However, in 2's complement representation, multiplier units take more area in comparison to the multiplier units following sign-magnitude representation.

Control and Timing Unit

A control and timing block is required to sequence the operation of the disclosed LMS engine. This unit is necessary for loading the initial values of the filter coefficients as well as to start and stop the LMS engine as per channel conditions. This unit may well reside inside the read head controller. In FIG. 6, g_init and h_init represent the initial values of the filter coefficients; the controller uses the load_init signal to set the initial values of the filter coefficients.

Resource Utilization

Table 1 below shows resource utilization for the non-pipelined architecture on Virtex-7 FPGA VC-707 Evaluation Platform (Xilinx) [sign-magnitude representation]:

TABLE 1

| Resource utilization for the non-pipelined architecture | | |
| --- | --- | --- |
| Resource | Without Polar Symmetry | With Polar Symmetry |
| Register | 578 | 153 |
| LUT | 5979 | 4005 |
| Slice | 2031 | 1426 |
| DSP48E1 | 100 | 50 |

As expected, a significant reduction in resource requirement is observed when the polar symmetry is utilized in filter coefficients. By utilizing polar symmetry, approximately 73.5% reduction in the number of registers, 33% reduction in the number of LUTs, 29.8% reduction in the number of slices and 50% reduction in the number of DSP units required for implementation is observed.

Simulation Results

Figure 11:
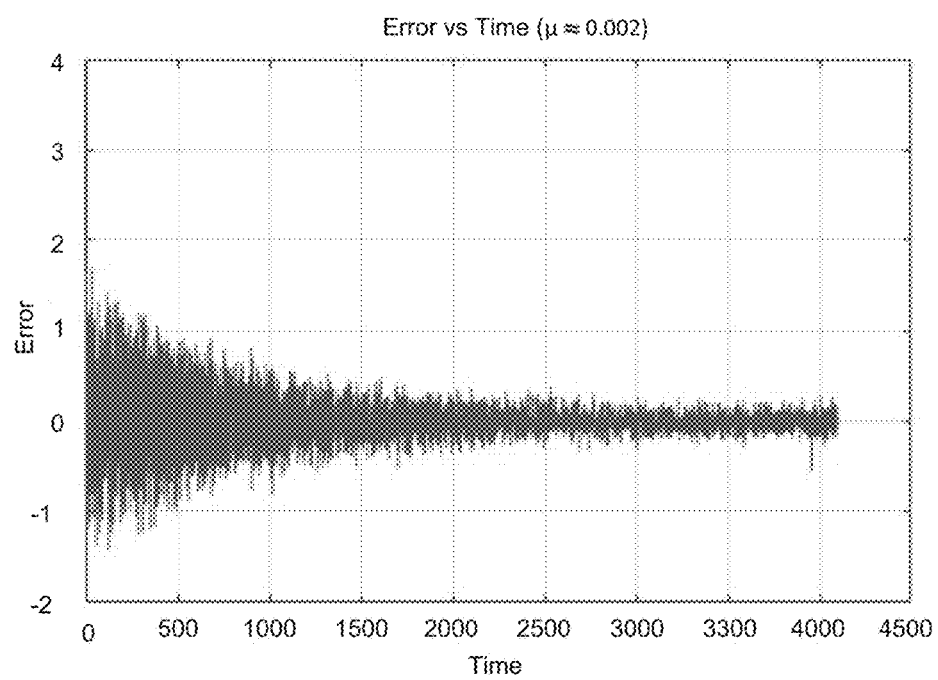
FIG. 11 illustrates an exemplary plot of error for adaptation on a 64×64 page of samples in accordance with embodiments of the present disclosure.
Figure 12:
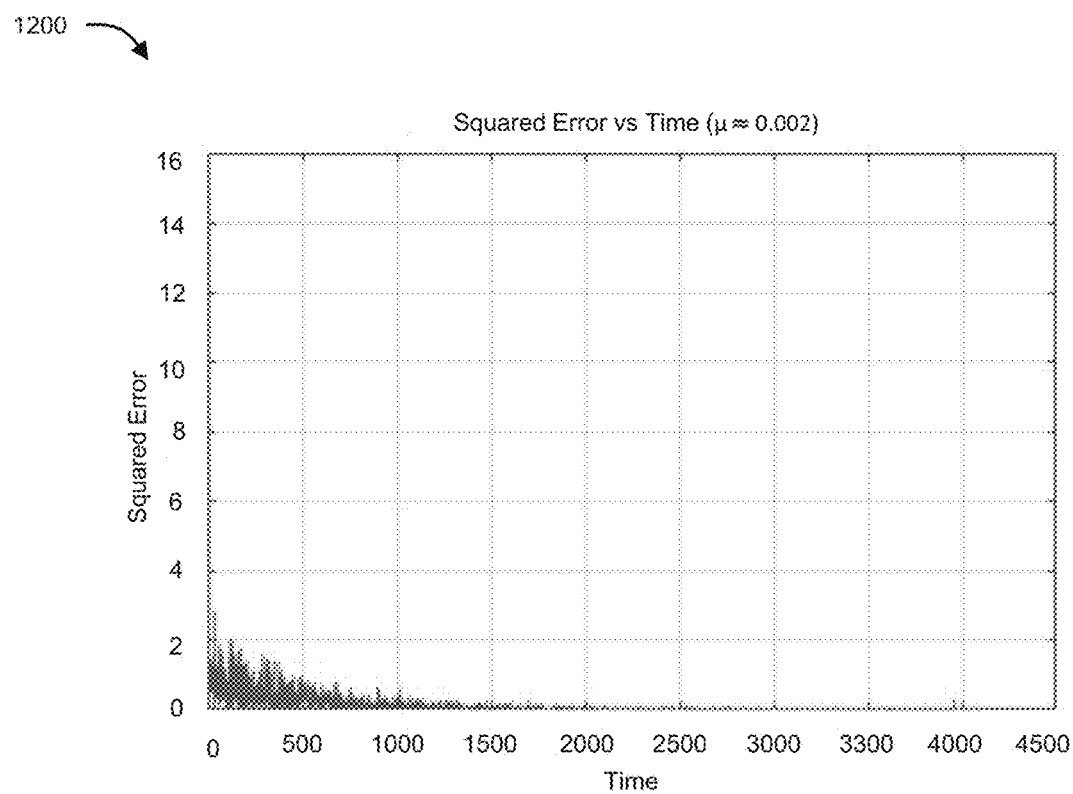
FIG. 12 illustrates an exemplary squared plot of error for adaptation on a 64×64 page of samples in accordance with embodiments of the present disclosure.

The design was simulated for Virtex-7 FPGA. Random inputs were generated using rand function in MATLAB and then response of the channel (modelled as a 2D ISI channel with AWGN) was computed. This was used as input to the equalizer. The simulations were done for $PW50_x$=bit-width and $PW50_y$=bit-height with AWGN of SNR=10 dB where PW50 denotes the width of the pulse at half the peak amplitude and the subscripts x and y denote the two dimensions. FIG. 11 shows the plot of error signal for a page of 64×64 input samples. FIG. 12 shows the plot of squared error for the same simulation.

Final Values of Filter Coefficients

Figures 17A, 17B:
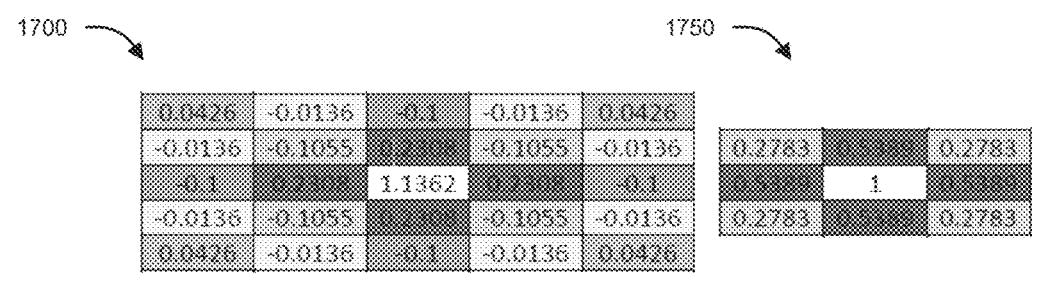

Values of the filter coefficients at the end of simulation of 64×64 samples are as shown in FIGS. 17A and 17B for the equalizer and the PR target respectively. These values are very close to the theoretical values found by running simulations in MATLAB and shown in FIGS. 18A and 18B.

Convergence Time Vs Value of Learning Parameter (µ)

Figure 13:
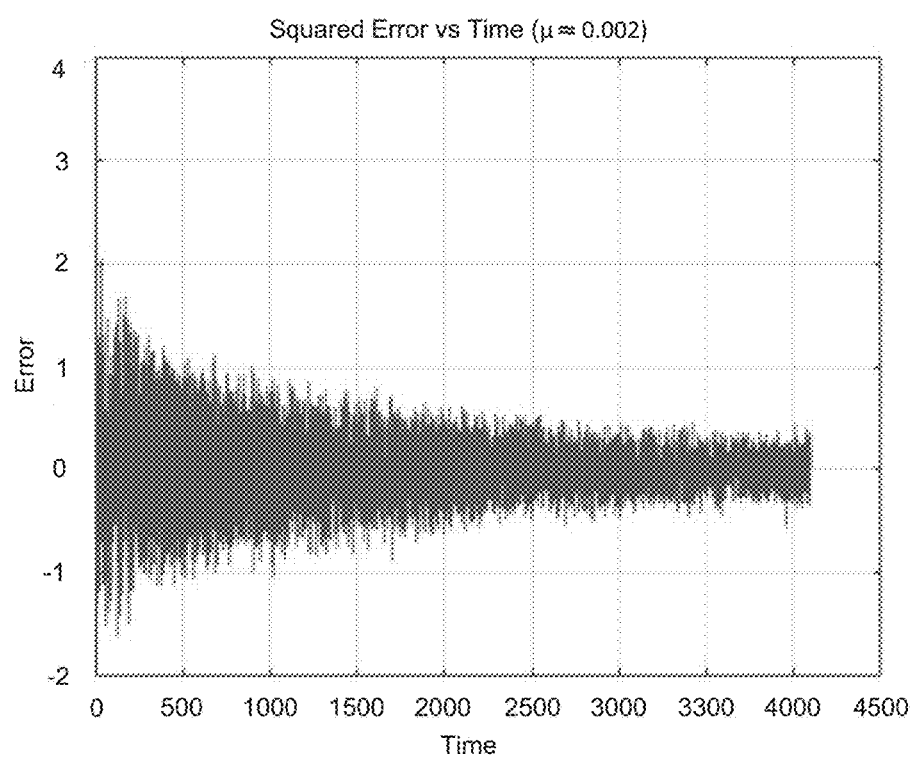
FIG. 13 illustrates an exemplary plot of error for adaptation on a 64×64 page of samples ($\mu \approx 0.001$) in accordance with embodiments of the present disclosure.
Figure 14:
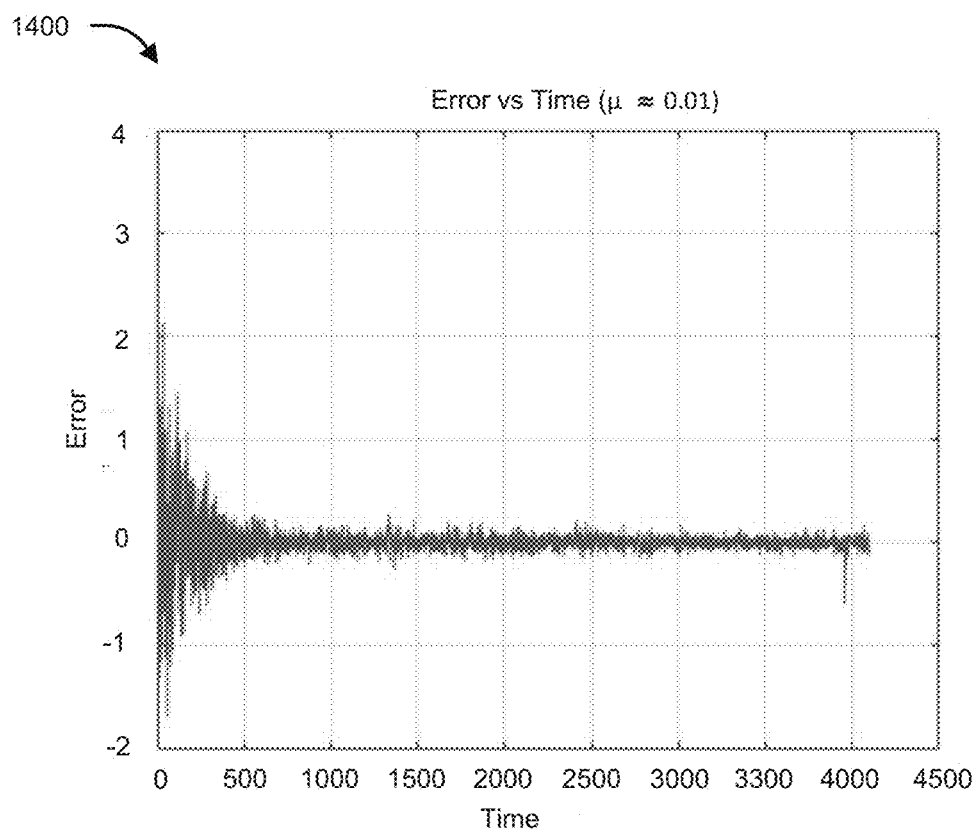
FIG. 14 illustrates an exemplary plot of error for adaptation on a 64×64 page of samples (μ≈0.01) in accordance with embodiments of the present disclosure.
Figure 15:
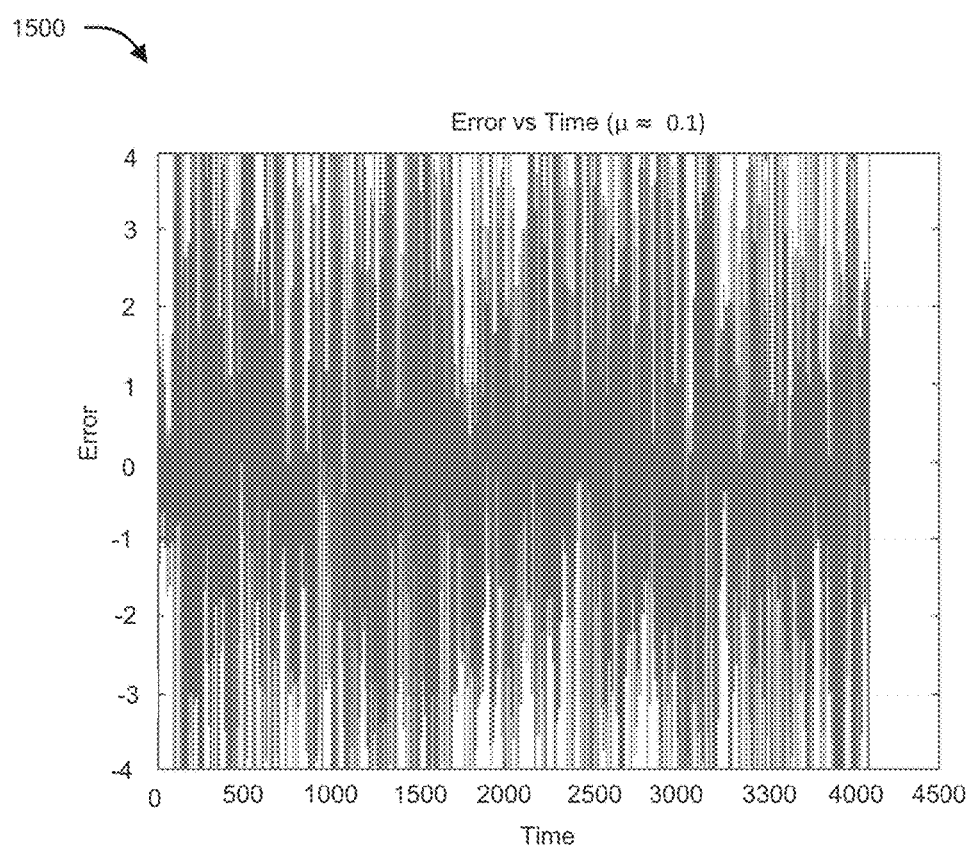
FIG. 15 illustrates an exemplary plot of error for adaptation on a 64×64 page of samples (μ≈0.1) in accordance with embodiments of the present disclosure.

FIGS. 13, 14 and 15 illustrate exemplary plots 1300. 1400 and 1500 of error for 64×64 samples for µ=0.001, 0.01 and 0.1 respectively. Here, convergence time is defined as time required for the system to reach a point where squared error<0.001. In all cases initial values for the filter coefficients were 0.05 approximately. As can be observed from the Table 2 below, the choice of µ has significant effect on the convergence time. Thus, the value of the learning parameter must be chosen with great care.

TABLE 2

| Convergence time v/s value of the learning parameter | | |
| --- | --- | --- |
| µ | Convergence Time (In cycles) | Mean Squared Rrror (for 64 × 64 cycles) |
| 0.001 | 830 | 0.1999 |
| 0.002 | 32 | 0.1091 |

TABLE 2-continued

Convergence time v/s value of the learning parameter

| μ | Convergence Time (In cycles) | Mean Squared Rrror (for 64 × 64 cycles) |
|---|---|---|
| 0.01 | 97 | 0.0318 |
| 0.1 | (diverges) | 4.4231 |

Convergence Time Vs Initial Filter Coefficients

In order to observe how convergence time is influenced by the initial values of the filter coefficients various simulations were run keeping the learning parameter (μ) fixed at 0.002 ("0010" in Q2.13 format). Table 3 below shows the convergence times when all the filter coefficients are initially set at 0.001, 0.01, 0.05 and 0.1 (approximate values in Q2.13 format). Of course, $g_{0,0}$ was kept at unity adhering to monic constraint. Again, the convergence times (in cycles) is the time taken by the system to reach a point where squared error<0.001.

TABLE 3

Convergence time vs. value of initial filter coefficients

| Initial Value | Convergence Time (In Cycles) |
|---|---|
| 0.001 | 725 |
| 0.01 | 358 |
| 0.05 | 32 |
| 0.1 | 6 |

Adaptability with Changing SNR

Figure 16:
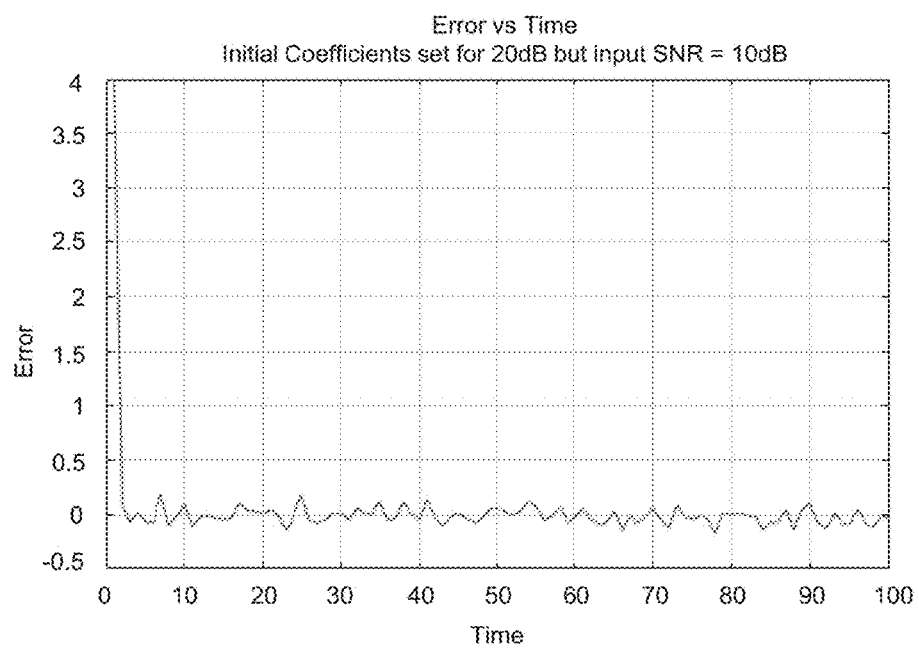
FIG. 16 illustrates an exemplary error plot when the initial coefficients correspond to SNR=20 dB but actual SNR=10 dB in accordance with embodiments of the present disclosure.

To investigate the adaptability of the loop, the filter coefficients were set at values corresponding to SNR=20 dB. Then input samples were fed in at SNR=10 dB. FIG. 16 shows the error plot for the same. It can be observed that the system took only 2 cycles (μ≈0.002) to reach the point where squared error<0.001. Clearly, the loop adapted very quickly to changing SNR conditions.

Speed

Static Timing Analysis for Virtex-7 VC707 Evaluation Platform shows that the adaptive engine shown in FIG. 5 can be clocked at 44 MHz. Here, the major contribution of propagation delay is due to the adder structure present in the equalizer block. Pipelining the design as shown in FIG. 6, can enable clocking the circuit at 218 MHz for 2's complement representation. In the pipelined architecture, the multiplier unit is the limiting factor for deciding the frequency of operation. With sign-magnitude representation, multiplier units are less complex and static timing analysis for the aforementioned FPGA show a maximum attainable frequency of 230 MHz.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a method and apparatus that enables achieving bit densities higher than ~1 Tb/in² on conventional magnetic recording media as well as for optical recording and related physical data storage technologies.

The present disclosure provides a method and apparatus for two-/three dimensional magnetic recording, holographic storage, 3D flash memories etc., which are a natural extension of 1D data recording technologies.

The present disclosure provides a method and apparatus for multi-dimensional magnetic recording such as TDMR with higher storage densities that have an acceptable level of Inter Symbol Interference (ISI) and noise.

The present disclosure provides a method and apparatus that increases bit density through near optimal 2D/multi-dimensional signal detection adaptively choosing optimal GPR target designs.

The present disclosure provides a method and apparatus that is cognizant of channel conditions.

The present disclosure provides a method and apparatus that takes into account the time-varying nature of the channel, and thus helps mitigate effects of SNR variations along with ISI reduction/control.

The present disclosure provides a method and apparatus that allow low complexity detection by separable targets resulting in significant throughput gains.

We claim:

1. A method for processing of multi-dimensional read back signal to reduce Inter Symbol Interference (ISI) and noise, said method comprising the step of:
    equalizing the read back signal using a linear equalizer that adapts to varying channel conditions; and
    designing a Partial Response (PR) target for signal detection based on Partial Response Maximum Likelihood (PRML) and the equalizer output, wherein the equalizer and the PR target are jointly adapted;
    wherein the step of equalizing enables handling of channel conditions accounting for one or more time varying factors selected from any or a combination of wear and tear, media and temperature variations.

2. The method of claim 1, wherein the equalizer is any of a separable or a non-separable equalizer.

3. The method of claim 1, wherein the PR target is any of a separable or a non-separable PR target.

4. The method of claim 1, wherein the equalizer performs equalization for both separable and non-separable PR targets.

5. An apparatus comprising an adaptation engine, said engine being configured to, along with an equalizer and a PR target, update filter coefficients of both the equalizer and the PR target to enable processing of a multi-dimensional read-back signal to reduce Inter Symbol Interference (ISI) and noise;
    wherein polar symmetry of the PR target is used to optimize the adaptation engine.

6. The apparatus of claim 5, wherein the equalizer performs equalization under varying channel conditions.

7. The apparatus of claim 5, wherein the apparatus is disk drive.

8. The apparatus of claim 5, wherein the PR target is a 2D separable PR target such that the PR target is extended to polygons of 2N sides using 1D separable components.

9. The apparatus of claim 5, wherein the PR target is a multi-dimensional separable PR target such that the PR target is extended to 2N faces using 1D separable components.

10. The apparatus of claim 5, wherein realization of 2D and multi-dimensional separable PR targets is performed using less than N non-1D components.

11. A method for processing of multi-dimensional read back signal to reduce Inter Symbol Interference (ISI) and noise, said method comprising the step of:
- equalizing the read back signal using a linear equalizer that adapts to varying channel conditions; and
- designing a Partial Response (PR) target for signal detection based on Partial Response Maximum Likelihood (PRML) and the equalizer output, wherein the equalizer and the PR target are jointly adapted;

wherein one or more filter coefficients for the linear equalizer and the PR target are jointly adapted to account for channel condition to help mitigate effects of SNR variations along with ISI reduction/control; and wherein output of the equalizer is compared with target response to obtain an error that is used to update the one or more filter coefficients.

12. The method of claim 11, wherein the equalizer is any of a separable or a non-separable equalizer.

13. The method of claim 11, wherein the PR target is any of a separable or a non-separable PR target.

14. The method of claim 11, wherein the equalizer performs equalization for both separable and non-separable PR targets.

15. The method of claim 11, wherein the equalizer performs equalization for both separable and non-separable PR targets.

* * * * *